United States Patent
Tzikas et al.

(10) Patent No.: US 6,630,005 B1
(45) Date of Patent: Oct. 7, 2003

(54) MIXTURES OF REACTIVE DYES AND THEIR USE

(75) Inventors: Athanassios Tzikas, Pratteln (CH); Urs Lehmann, Basel (CH); Herbert Klier, Efringen-Kirchen (DE)

(73) Assignee: Giba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/831,039

(22) PCT Filed: Nov. 3, 1999

(86) PCT No.: PCT/EP99/08394
§ 371 (c)(1),
(2), (4) Date: May 3, 2001

(87) PCT Pub. No.: WO00/29487
PCT Pub. Date: May 25, 2000

(30) Foreign Application Priority Data

Nov. 12, 1998 (CH) ............................................. 2274/98

(51) Int. Cl.$^7$ .............................................. C09B 62/00
(52) U.S. Cl. ........................ 8/549; 8/543; 8/641; 8/918
(58) Field of Search ........................... 8/543, 549, 641, 8/918

(56) References Cited

U.S. PATENT DOCUMENTS 5,324,329 A * 6/1994 Washimi et al. ............... 8/543
5,428,141 A 6/1995 Herd et al. ................. 534/638
6,136,045 A 10/2000 Pedemonte et al. ............ 8/549

FOREIGN PATENT DOCUMENTS

| EP | 0545219 | 6/1993 |
| EP | 0576026 | 12/1993 |
| JP | 56103249 A | * 8/1981 |

OTHER PUBLICATIONS

Derwent Abstr. 1981–72580D for JP 56103249 (1981).

* cited by examiner

Primary Examiner—Yogendra N. Gupta
Assistant Examiner—Eisa Elhilo
(74) Attorney, Agent, or Firm—Kevin T. Mansfield

(57) ABSTRACT

Dye mixtures, which comprise at least one dye of formula (1) together with at least one dye of formula (2), wherein $R_1$, $R_2$, $R_4$ and $R_5$ are each independently of one another hydrogen or unsubstituted or substituted $C_1$–$C_4$alkyl, $(R_3)_{0-2}$ is 0 to 2 identical or different substituents selected from the group consisting of $C_2$–$C_4$halogen alkanoylamino, $C_1$–$C_4$alkyl or $C_1$–$C_4$alkoxy, $A_1$ and $A_2$ are each independently of the other an unsubstituted or substituted phenylene radical or a $C_1$–$C_8$alkylene radical which may be interrupted by oxygen, D is a radical of formula (3) or (4) wherein is $(R_6)_{0-2}$ 0 to 2 identical or different substituents selected from the group consisting of halogen, $C_2$–$C_4$alkanoylamino, $C_1$–$C_4$alkyl and $C_1$–$C_4$alkoxy, $X_1$ and $X_2$ are halogen, and $Y_1$ and $Y_2$ are each independently of the other a fiber-reactive radical of formula: —$SO_2$—Z (5a): —CONH—$(CH_2)_m$—$SO_2$—Z (5b); —NH—CO—CH(Hal)—$CH_2$—Hal (5c).

15 Claims, No Drawings

MIXTURES OF REACTIVE DYES AND THEIR USE

The present invention relates to novel improved reactive dye mixtures which are particularly suitable for dyeing or printing nitrogen-containing or hydroxyl group-containing fibre materials by processes which are customarily used for reactive dyes and which yield dyeings which are fast to wet treatment and light; and to a process for the preparation of these dye mixtures, as well as to their use for dyeing or printing textile materials.

Accordingly, this invention relates to dye mixtures, which comprise at least one dye of formula (1)

(1)

together with at least one dye of formula (2)

(2)

wherein $R_1$, $R_2$, $R_4$ and $R_5$ are each independently of one another hydrogen or unsubstituted or substituted $C_1$–$C_4$alkyl, $(R_3)_{0-2}$ is 0 to 2 identical or different substituents selected from the group consisting of halogen, $C_2$–$C_4$alkanoylamino, $C_1$–$C_4$alkyl and $C_1$–$C_4$alkoxy, $A_1$ and $A_2$ are each independently of the other an unsubstituted or substituted phenylene radical or a $C_1$–$C_8$alkylene radical which may be interrupted by oxygen, D is a radical of formula (3) or (4)

(3)

or (4)

wherein $(R_6)_{0-2}$ is 0 to 2 identical or different substituents selected from the group consisting of halogen, $C_2$–$C_4$alkanoylamino, $C_1$–$C_4$alkyl and $C_1$–$C_4$alkoxy, $X_1$ and $X_2$ are halogen, and $Y_1$ and $Y_2$ are each independently of the other a fibre-reactive radical of formula (5a), (5b), (5c) or (5d)

—SO$_2$—Z   (5a),

—CONH—(CH$_2$)$_m$—SO$_2$—Z   (5b),

—NH—CO—CH(Hal)—CH$_2$Hal   (5c) or

—NH—CO—C(Hal)=CH$_2$   (5d), wherein m is the number 2, 3 or 4,

Hal is halogen, and

Z is vinyl or a radical —CH$_2$—CH$_2$—U, and U is a group which may be split off with alkali.

$R_1$, $R_2$, $R_4$ and $R_5$ defined as $C_1$–$C_4$alkyl may suitably be each independently of one another typically methyl, ethyl, propyl, isopropyl, butyl, sec-butyl, tert-butyl or isobutyl, preferably methyl or ethyl and, particularly preferably, methyl. The cited alkyl radicals may be unsubstituted or substituted by e.g. hydroxy, sulfo, sulfato, cyano or carboxyl. The corresponding unsubstituted alkyl radicals are preferred.

$R_3$ and $R_6$ defined as $C_1$–$C_4$alkyl may suitably be each independently of the other e.g. methyl, ethyl, propyl, isopropyl, butyl, sec-butyl, tert-butyl or isobutyl, preferably methyl or ethyl and, particularly preferably, methyl.

$R_3$ and $R_6$ defined as $C_1$–$C_4$alkoxy may suitably be each independently of the other e.g. methoxy, ethoxy, propoxy, isopropoxy, butoxy or isobutoxy, preferably methoxy or ethoxy and, particularly preferably, methoxy.

$R_3$ and $R_6$ defined as $C_2$–$C_4$alkanoylamino may suitably be each independently of the other e.g. acetylamino or propionylamino and, preferably, acetylamino.

$R_3$ and $R_6$ defined as halogen may suitably be each independently of the other e.g. fluoro, chloro or bromo, preferably chloro or bromo and, particularly preferably, chloro.

Hal is, for example, fluoro, chloro or bromo, preferably chloro or bromo, particularly preferably bromo.

m in the fibre-reactive group of formula (5b) is preferably the number 2.

$X_1$ and $X_2$ defined as halogen may suitably be each independently of the other e.g. fluoro, chloro or bromo.

Preferred dye mixtures are those, wherein $R_1$, $R_2$, $R_4$ and $R_5$ are each independently of one another hydrogen or $C_1$–$C_4$alkyl, preferably hydrogen.

In the novel dye mixtures, D defined as a radical of formula (3) is, for example, a radical of formula (3.1)

(3.2)

-continued
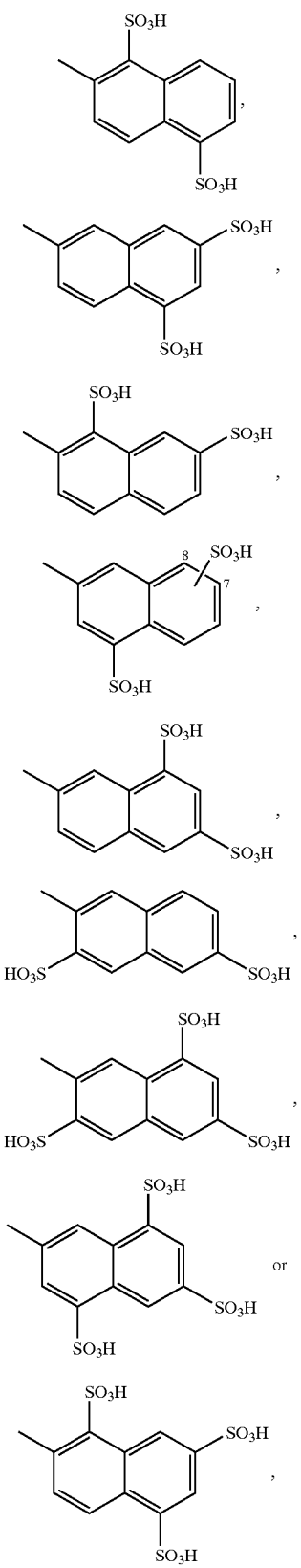
preferably a radical of formula (3.3).
In the novel dye mixtures, D defined as a radical of formula (4) is, for example, a radical of formula
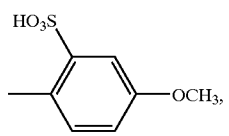 (4.1)
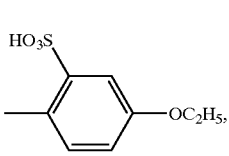 (4.2)
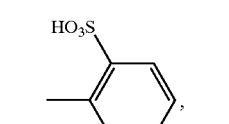 (4.3)
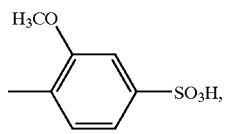 (4.4)
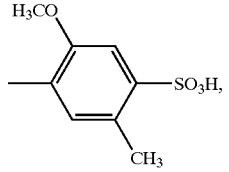 (4.5)
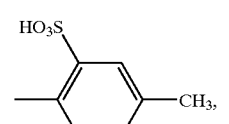 (4.6)
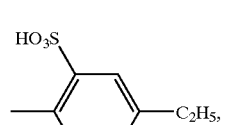 (4.7)
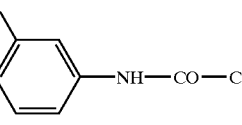 (4.8)
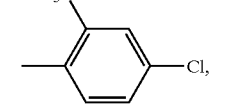 (4.9)
preferably a radical of formula (4.1) or (4.6) and, particularly preferably, a radical of formula (4.1).
In a preferred embodiment of the dye mixtures of this invention, D defined as a radical of formula (3) is a radical of formula (3a)

(3a)

[Structure: naphthalene with methyl and (SO$_3$H)$_2$ substituents]

and, defined as a radical of formula (4), a radical of formula (4a)

(4a)

[Structure: benzene ring with methyl, SO$_3$H, and R$_6$ substituents]

wherein

R$_6$ is hydrogen, C$_1$–C$_4$alkyl or C$_1$–C$_4$alkoxy, preferably hydrogen, methyl, ethyl, methoxy or ethoxy, more preferably methyl or methoxy and, very particularly preferably, methoxy.

Preferred dye mixtures are those, wherein X$_1$ and X$_2$ are each independently of the other fluoro or chloro, preferably chloro.

The meanings of X$_1$ and X$_2$ in the novel dye mixtures are preferably identical.

Suitable leaving groups U are, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$–C$_4$alkyl or —OSO$_2$—N(C$_1$–C$_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, more preferably —Cl or —OSO$_3$H and, particularly preferably, —OSO$_3$H.

If A$_1$ or A$_2$ in the novel dye mixtures are defined as an unsubstituted or substituted phenylene radical, suitable substituents are each independently of the other e.g. identical or different radicals selected from the group consisting of halogen, C$_1$–C$_4$alkyl, C$_1$–C$_4$alkoxy and sulfo, preferably of C$_1$–C$_4$alkyl, C$_1$–C$_4$alkoxy and sulfo and, particularly preferably, of methyl, methoxy and sulfo. The fibre-reactive Y$_1$ or Y$_2$ are in this case each independently of the other radicals of formula (5a), (5b), (5c) or (5d), preferably of formula (5a) or (5b), which radicals have the above-cited meanings and preferred meanings.

A$_1$ or A$_2$ defined as a C$_1$–C$_8$alkylene radical which may be interrupted by oxygen may suitably be each independently of the other e.g. ethylene, propylene, isopropylene, butylene, isobutylene, —(CH$_2$)$_2$—O—(CH$_2$)$_2$—, —(CH$_2$)$_3$—O—(CH$_2$)$_2$— or —(CH$_2$)$_3$—O—(CH$_2$)$_3$—. The fiber-reactive Y$_1$ or Y$_2$ are in this case preferably a radical of formula (5a), which has the above-cited meanings and preferred meanings. A$_1$ and A$_2$ are preferably a C$_1$–C$_6$alkylene radical which is correspondingly interrupted and, particularly preferably, a C$_1$–C$_4$alkylene radical such as ethylene or —(CH$_2$)$_2$—O—(CH$_2$)$_2$—.

In a preferred embodiment of the novel dye mixtures, the radicals of formulae —A$_1$—Y$_1$ and A$_2$—Y$_2$ in the dyes of formulae (1) and (2) are each independently of the other a radical of formula (6a), (6b) or (6c)

(6a)

[Structure: benzene ring with methyl, SO$_2$—Z$_1$, and (R$_7$)$_{0-2}$ substituents, positions 3 and 4 marked]

-continued (6b)

[Structure: benzene ring with methyl, (SO$_3$H)$_{0-1}$, and CO—NH—(CH$_2$)$_2$—SO$_2$—Z$_2$ substituents, positions 3 and 4 marked] or (6c)

[Structure: benzene ring with methyl, SO$_3$H, and Y substituents, positions 3 and 4 marked]

wherein (R$_7$)$_{0-2}$ is 0 to 2 identical or different substituents selected from the group consisting of sulfo, methyl or methoxy, Y is α,β-dibromopropionylamino or α-bromoacryloylamino, and Z$_1$ and Z$_2$ are each independently of the other vinyl, β-chloroethyl or β-sulfatoethyl, preferably vinyl or β-sulfatoethyl.

In the radicals of formula (6a), the fibre-reactive group —SO$_2$—Z$_1$ is preferably in 4-position.

R$_7$ is preferably hydrogen.

In the radicals of formula (6b), the fibre-reactive group —CO—NH—(CH$_2$)$_2$—SO$_2$—Z$_2$ is preferably in 3-position. The radical of formula (6b) preferably does not contain any sulfo group at the benzene ring.

In a particularly preferred embodiment of the novel dye mixtures, the radicals of formulae —A$_1$—Y$_1$ and A$_2$—Y$_2$ in the dyes of formulae (1) and (2) are each independently of the other a radical of formula (6a) or (6b), preferably, of formula (6a), which radicals have the above-cited meanings and preferred meanings.

—A$_1$—Y$_1$ and A$_2$—Y$_2$ in the novel dye mixtures are preferably identical.

Preferred dye mixtures are those, which comprise at least one dye of formula (1a)

(1a)

[Structure: complex azo dye with SO$_3$H, HO, HO$_3$S, triazine with X$_1$, NH—A$_1$—Y$_1$, and R$_3$ substituents]

together with at least one dye of formula (2a)

(2a)

[Structure: complex azo dye with HO, HO$_3$S, triazine with X$_2$, NH—A$_2$—Y$_2$, and D—N=N— substituents]

wherein

R$_3$ is hydrogen, C$_1$–C$_4$alkyl or C$_1$–C$_4$alkoxy, preferably hydrogen, methyl or methoxy, D is a radical of formula (3a) or (4a), X$_1$ and X$_2$ are each independently of the other fluoro or chloro, and —A$_1$—Y$_1$ and A$_2$—Y$_2$ are each independently of the other a radical of formula (6a) or (6b), which radicals have the above-cited meanings and preferred meanings.

In the dyes of formulae (1a) and (2a) of the novel dye mixtures, the aminotriazinyl radical of formulae

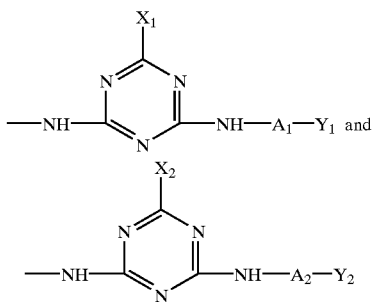

is preferably bound in 3-position to the coupling component of the azo chromophore.

In a particularly preferred embodiment of this invention, the novel dye mixtures comprise at least one dye of formula (1b)

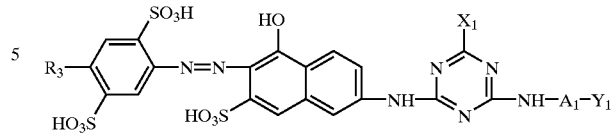

together with at least one dye of formula (2b)

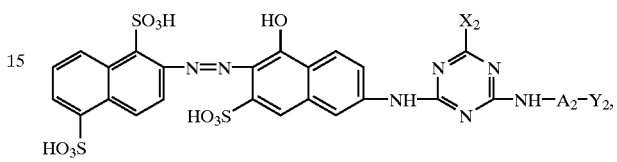

wherein
$R_3$ is hydrogen or methyl, preferably hydrogen, and
$X_1$ and $X_2$ and $—A_1—Y_1$ and $A_2—Y_2$ each have the above meanings and preferred meanings.

In another particularly preferred embodiment of this invention, the novel dye mixtures comprise at least one dye of formula (1c)

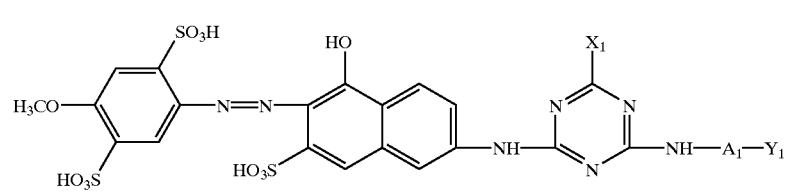

together with at least one dye of formula (2c)

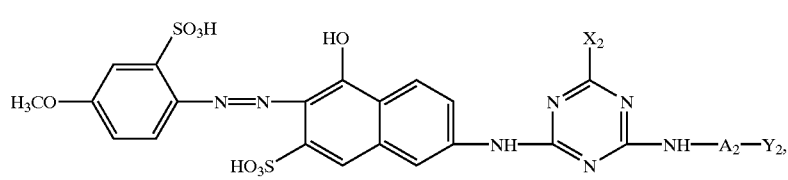

wherein
$X_1$ and $X_2$ and $—A_1—Y_1$ and $A_2—Y_2$ each have the above meanings and preferred meanings.

This invention also relates to a process for the preparation of the novel dye mixtures, which comprises reacting a compound of formula

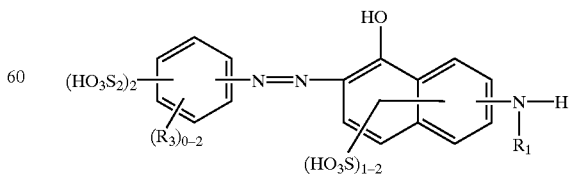

and a compound of formula

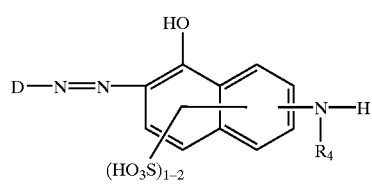

with cyanuric halide and an amine selected from the group consisting of formulae (9) and

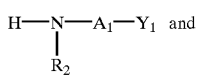

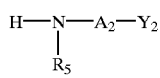

in any sequence with each other, $R_1$, $R_2$, $R_3$, $R_4$, $R_5$, $A_1$, $A_2$, $D$, $Y_1$ and $Y_2$ having the above meanings and preferred meanings.

As the individual process steps described above can be carried out in different sequence, or also simultaneously, different process variants are possible. The reaction is normally carried out stepwise, the sequence of the simple reactions between the individual reaction components preferably depending on the particular conditions. Thus, for example, about one molar equivalent of an amine of formula (9) and/or (10) is reacted with about one molar equivalent of cyanuric halide and the resulting product is then condensed with about one molar equivalent of a mixture of the compounds of formulae (7) and (8). In another process variant e.g. about one molar equivalent of a mixture of the compounds of formulae (7) and (8) is reacted with about one molar equivalent of cyanuric halide and the resulting mixture is then condensed with about one molar equivalent of an amine of formula (9) and/or (10). The ratio of the dyes of formulae (1) and (2) in the novel dye mixtures depends in this case on the mixture ratio of the compounds of formulae (7) and (8).

The individual condensation reactions are carried out, for example, by processes known per se, usually in an aqueous solution and in the temperature range from e.g. 0 to 50° C., preferably from 0 to 10° C., and at a pH from e.g. 3 to 10, preferably from 3 to 7.

Suitable cyanuric halides are, for example, cyanuric chloride and cyanuric fluoride, preferably cyanuric chloride.

After the synthesis, conversion reactions may also be carried out, for example an elimination reaction. The novel dye mixtures containing β-sulfatoethylsulfonyl radicals or α,β-dihalopro-pionylamino radicals may, for example, be treated with a base, such as sodium hydroxide, the sulfatoethylsulfonyl radicals converting into vinyl sulfonyl radicals and the α,β-dihalopro-pionylamino radicals converting into α-haloacryloylamino radicals.

The compounds of formulae (7), (8), (9) and (10) are known or may be prepared in analogy to known compounds.

The novel dye mixtures can, for example, also be prepared by mixing the individual dyes of formulae (1) and (2). This mixing process is typically carried out in suitable mills, e.g. ball or pin mills, and in kneaders or mixers.

The dyes of formulae (1) and (2) of the novel dye mixtures are used either in the form of their free acids or, preferably, in the form of their salts. Suitable salts are, for example, the alkali metal, alkaline earth metal or ammonium salts or the salts of an organic amine. Examples to be mentioned are the sodium, lithium, potassium or ammonium salts or the salt of the mono-, di- or triethanolamine.

The dyes of formula (1) or (2) are present in the novel dye mixture e.g. in a weight ratio from 10:90 to 90:10, preferably from 20:80 to 80:20 and, particularly preferably, from 25:75 to 75:25.

The novel reactive dye mixtures are suitable for dyeing and printing a very wide range of materials, such as silk, leather, wool, polyamide fibres and polyurethanes and, in particular, cellulosic fibre materials of all kinds. Such fibre materials are, for example, the natural cellulose fibres, such as cotton, linen and hemp, and cellulose and regenerated cellulose, e.g. viscose, and also modal fibres and their mixtures with cotton. The reactive dye mixtures are also suitable for dyeing or printing hydroxyl group-containing fibres present in blends, for example blends of cotton with polyamide fibres or, in particular, with polyester fibres.

In another of its aspects, this invention accordingly relates to a process for dyeing or printing hydroxyl group-containing or nitrogen-containing fibre materials with the novel dye mixtures, preferably cellulosic fibre materials and, in particular, cotton-containing fibre materials.

The novel dye mixtures can be applied to and fixed on the fibre material in different manner, in particular in the form of aqueous dye solutions and printing pastes. They are suitable both for the exhaust process and for dyeing by the pad-dyeing process, in which the goods are impregnated with aqueous and optionally saline dye solutions and the dyes are fixed after treatment with alkali or in the presence of alkali, where necessary with heating. After fixing, the dyeings or prints are thoroughly rinsed with cold and hot water, if required with addition of a dispersant which promotes the diffusion of the unfixed components.

The novel reactive dye mixtures are distinguished by high reactivity, good fixation and excellent build-up. They can therefore be used by the exhaust process at low dyeing temperatures and require only short steaming times in the pad-steam process. The degrees of fixation are high and the unfixed components can be easily washed off, the difference between degree of exhaustion and degree of fixation being remarkably small, i.e. the soap loss is very small. The reactive dye mixtures are also particularly suitable for printing, especially cotton, but also for printing nitrogen-containing fibres, e.g. wool or silk or blends containing wool or silk.

The dyeings and prints obtained using the novel dye mixtures have high tinctorial strength and high fibre-dye bond stability both in the acid and in the alkaline range, as well as good light fastness and very good wetfastness properties, such as fastness to washing, water, seawater, cross-dyeing and perspiration, and good fastness to pleating, ironing and rubbing.

The following Examples illustrate the invention in more detail. Temperatures are given in degrees Celsius and parts and percentages are by weight, unless otherwise stated. The ratio of parts by weight to parts by volume is the same as that of the kilogramme to the liter.

EXAMPLE 1

10.1 parts of the monoazo compound which, in the from of the free acid, corresponds to formula (101)

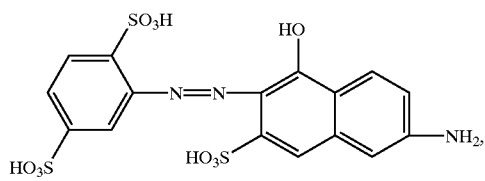
(101)

and 11.1 parts of the monoazo compound which, in the form of the free acid, corresponds to formula (102)

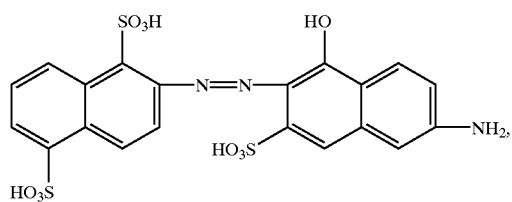
(102)

are stirred in 120 parts of water and adjusted to pH 6.5 to 7 with 1 N of HCl. The resulting solution is slowly added dropwise to a 0 to 5° C. cool suspension of 17.8 parts of the compound of formula (103)

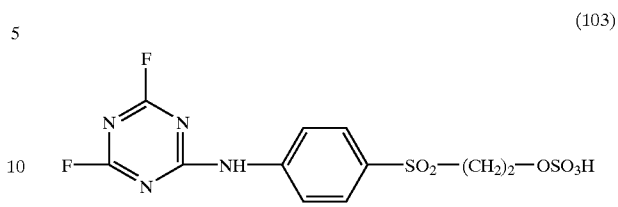
(103)

(obtained by condensing cyanuric fluoride with 4-(β-sulfatoethylsulfonyl)aniline) at pH 4.2. During the dropwise addition, the pH is slowly increased to 6 with 2 N of NaOH and the temperature is allowed to rise to 5 to 10° C. The mixture is stirred first for about one hour at 5 to 10° C. and then for about 20 hours at room temperature.

The reaction mixture is then adjusted to pH 11 with 15% NaOH and is stirred for one hour at room temperature. The pH of the reaction mixture is then adjusted to about 7 with 1N of HCl and the solution is freed from salt by dialysis. Concentration by evaporation yields 40.9 parts of a dye mixture which contains the dyes of formulae (104) and (105)

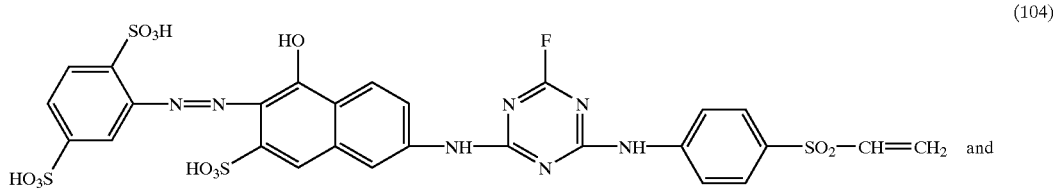
(104)

and

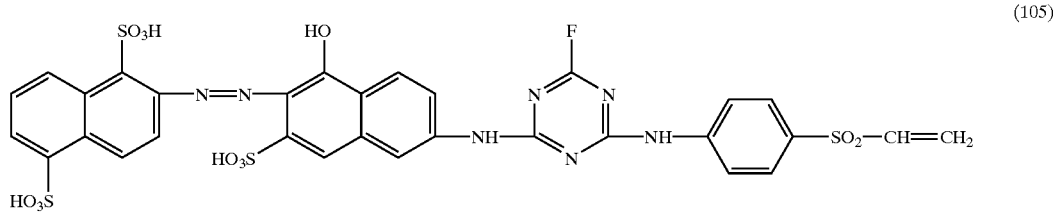
(105)

shown here in the form of their salts, in a weight ratio from 48.5:51.5. The dye mixture so obtained dyes cotton in an orange shade.

If the procedure of Example 1 is reversed by dropwise addition of the 0 to 5° C. cool suspension of the compound of formula (103) to the mixture of the monoazo compounds which, in the form of the free acid, correspond to formulae (101) and (102), then a dye mixture is like-wise obtained which contains the dyes of formulae (104) and (105) shown here in the form of the free acid.

EXAMPLE 2

The procedure of Example 1 is repeated, but replacing the 10.1 parts of the compound of formula (101) with an equimolar amount of the compound of formula (106)

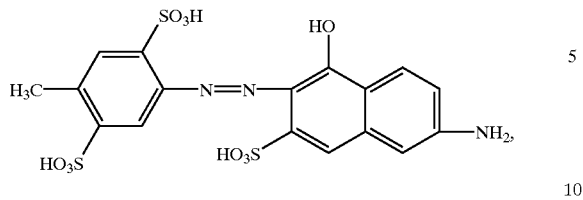
(106)

which yields a dye mixture containing the dyes of formulae (105) and (107)

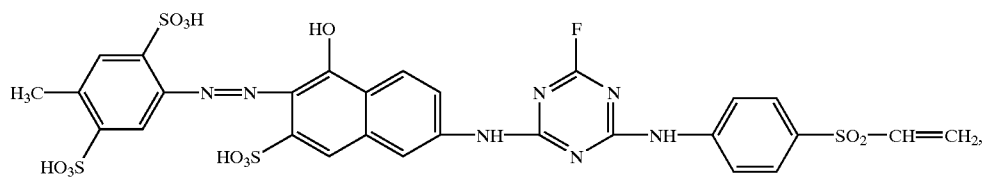
(107)

shown here in the form of the free acid, in a weight ratio from 49:51. The dye mixture so obtained dyes cotton in an orange shade.

EXAMPLE 3

The procedure of Example 1 is repeated, but replacing the 17.8 parts of the compound of formula (103) with an equimolar amount of the compound of formula (108)

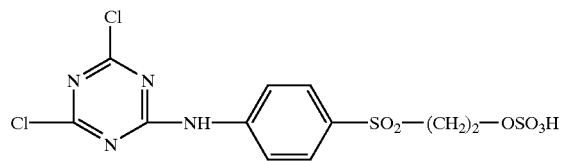
(108)

(obtained by condensing cyanuric chloride with 4-(β-sulfatoethylsulfonyl)aniline), which yields a dye mixture containing the dyes of formulae (109) and (110)

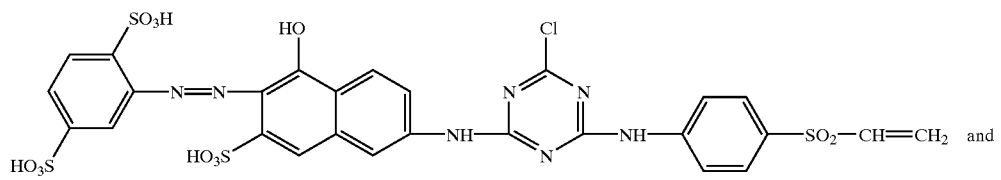
(109)

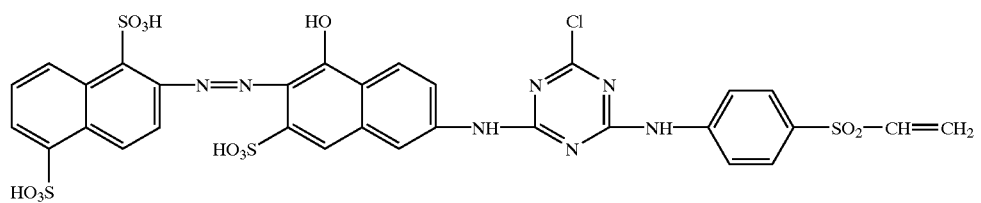
(110)

shown here in the form of the free acid, in a weight ratio from 49:51. The dye mixture so obtained dyes cotton in an orange shade.

EXAMPLES 4 TO 6

In general analogy to the instructions of Example 1, dye mixtures may be obtained containing dyes of the following general formulae (I) and (II)

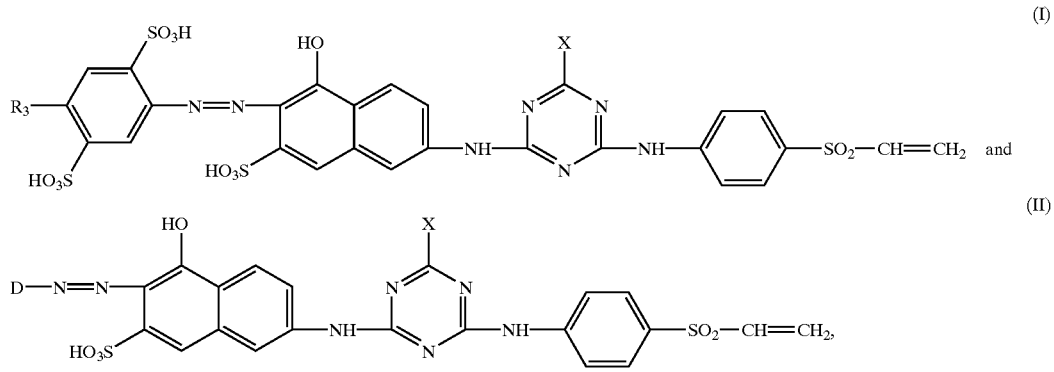

shown here in the form of the free acid, in the cited weight ratio, D, $R_3$ and X each having the meanings given in Table 1. These dye mixtures dye cotton in the cited shades.

TABLE 1

| Ex. | D | $R_3$ | X | (I):(II) | Shade |
|---|---|---|---|---|---|
| 4 | (2-methyl-5-sulfo-naphthalene) | $CH_3$ | Cl | 49:51 | orange |
| 5 | (4-methoxy-2-methyl-phenyl-SO$_3$H) | $OCH_3$ | F | 62.5:37.5 | scarlet |

TABLE 1-continued

| Ex. | D | $R_3$ | X | (I):(II) | Shade |
|---|---|---|---|---|---|
| 6 | (4-methoxy-2-methyl-phenyl-SO$_3$H) | $OCH_3$ | Cl | 63:37 | scarlet |

EXAMPLES 7 TO 12

In general analogy to the instructions of Example 1, dye mixtures may be obtained containing dyes of the following general formulae (III) and (IV)

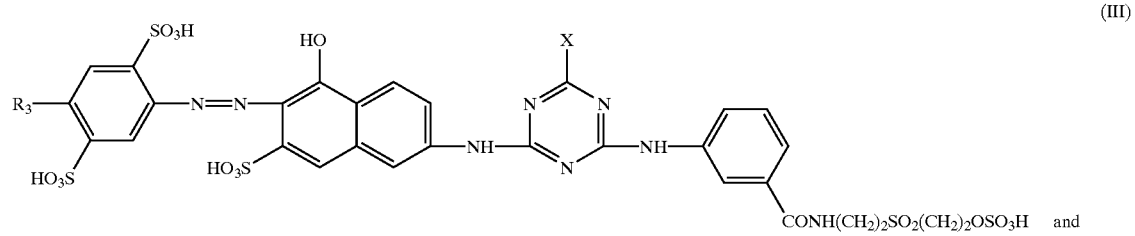

-continued

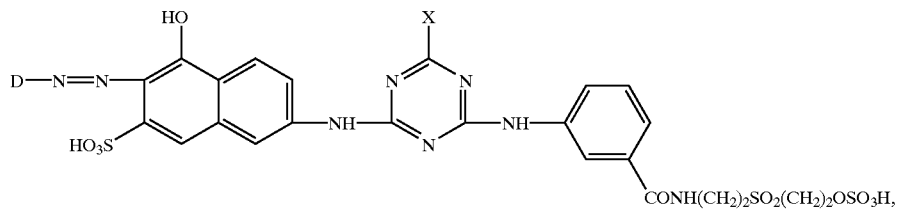

shown here in the form of the free acid, in the cited weight ratio, D, $R_3$ and X each having the meanings cited in Table 2, if the compound of formula (103) is replaced with a compound of the general formula (V)

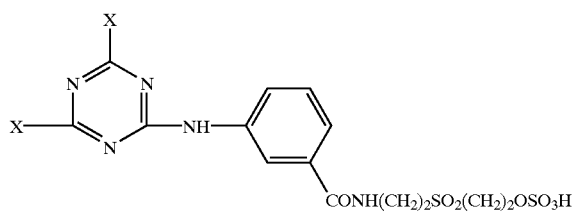

(obtained by condensing cyanuric fluoride (X=F) or cyanuric chloride (X=Cl) with an amine of formula

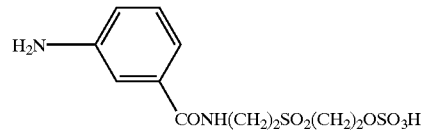

wherein X is F or Cl. These dye mixtures dye cotton in the cited shades.

TABLE 2

| Ex. | D | $R_3$ | X | (III):(IV) | Shade |
|---|---|---|---|---|---|
| 7 | naphthalene-SO$_3$H, HO$_3$S | H | Cl | 50:50 | orange |
| 8 | naphthalene-SO$_3$H, HO$_3$S | H | F | 50:50 | orange |
| 9 | naphthalene-SO$_3$H, HO$_3$S | CH$_3$ | Cl | 50:50 | orange |
| 10 | naphthalene-SO$_3$H, HO$_3$S | CH$_3$ | F | 50:50 | orange |
| 11 | benzene-SO$_3$H, H$_3$CO | OCH$_3$ | F | 61:39 | scarlet |
| 12 | benzene-SO$_3$H, H$_3$CO | OCH$_3$ | Cl | 62:38 | scarlet |

EXAMPLES 13 TO 16

In general analogy to the instructions of Example 1, dye mixtures may be obtained containing dyes of the following general formulae (V) and (VI)

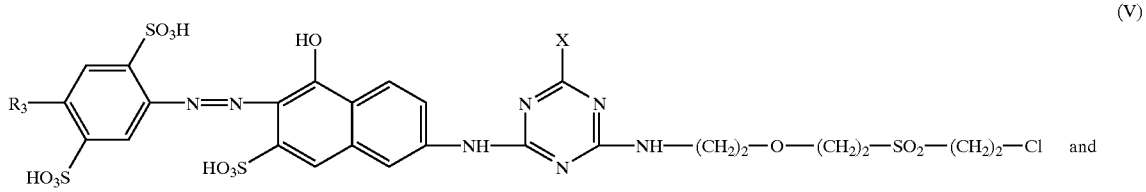

(V)

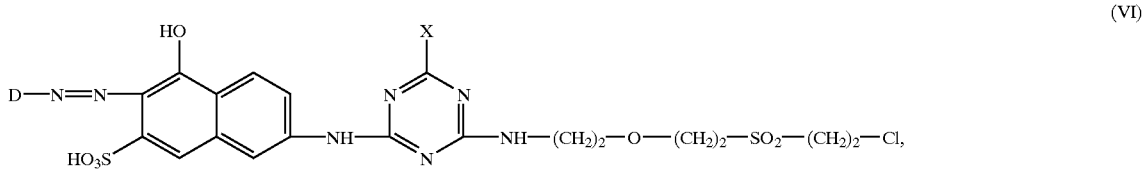

(VI)

shown here in the form of the free acid, in the cited weight ratio, D, R₃ and X each having the meanings given in Table 3, if the compound of formula (103) is replaced with a compound of the general formula (VII)

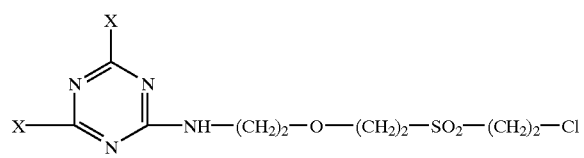

(VII)

(obtained by condensing cyanuric fluoride (X=F) or cyanuric chloride (X=Cl) with an amine of formula $H_2N-(CH_2)_2-O-(CH_2)_2-SO_2-(CH_2)_2-Cl$), wherein X is F or Cl. These dye mixtures dye cotton in the cited shades.

TABLE 3

| Ex. | D | R₃ | X | (V):(VI) | Shade |
|---|---|---|---|---|---|
| 13 | ![1-naphthol-5-sulfonic with SO₃H] | H | Cl | 50:50 | orange |
| 14 | ![1-naphthol-5-sulfonic with SO₃H] | H | F | 50:50 | orange |

TABLE 3-continued

| Ex. | D | R₃ | X | (V):(VI) | Shade |
|---|---|---|---|---|---|
| 15 | ![1-naphthol-5-sulfonic with SO₃H] | CH₃ | Cl | 50:50 | orange |
| 16 | ![methoxyphenyl with SO₃H, H₃CO] | OCH₃ | Cl | 62:38 | scarlet |

Dyeing Instructions 2 parts of the reactive dye mixture obtained according to Example 1 are dissolved in 400 parts of water. To this solution are added 1500 parts of a solution which contains 51 g/l of sodium chloride. 100 parts of cotton fabric are put into this dyebath at 60° C. and, after 45 minutes at 60° C., 100 parts of a solution containing 16 g/l of sodium hydroxide and 20 g of calcined sodium carbonate are added. Dyeing is continued for another 45 minutes at this temperature. The dyed goods are then rinsed, soaped at the boil for a quarter of an hour with a non-ionic detergent, rinsed again and dried.

As an alternative to the above instruction, it is possible to dye not at 60° C. but at 70° C. or 80° C.

Printing Procedure 3 parts of the reactive dye mixture obtained according to Example 1 are sprinkled, with rapid stirring, into 100 parts of a stock thickening which contains 50 parts of 5% sodium alginate thickening, 27.8 parts of water, 20 parts of urea, 1 part of sodium m-nitrobenzenesulfonate and 1.2 parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

What is claimed is:

1. A dye mixture, which comprises at least one dye of formula (1)

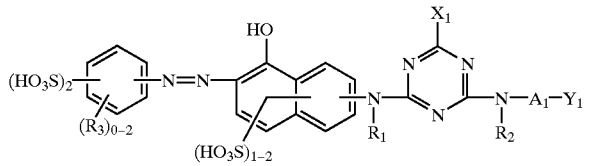
(1)

together with at least one dye of formula (2)

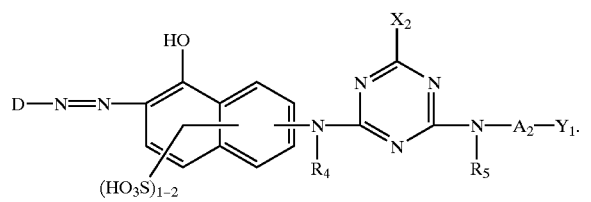
(2)

wherein
$R_1$, $R_2$, $R_4$ and $R_5$ are each independently of one another hydrogen or unsubstituted or substituted $C_1$–$C_4$alkyl,
$(R_3)_{0-2}$ is 0 to 2 identical or different substituents selected from the group consisting of halogen, $C_2$–$C_4$alkanoylamino, $C_1$–$C_4$alkyl and $C_1$–$C_4$alkoxy,
$A_1$ and $A_2$ are each independently of the other an unsubstituted or substituted phenylene radical or a $C_1$–$C_8$alkylene radical which may be interrupted by oxygen, D is a radical of formula (3) or (4)

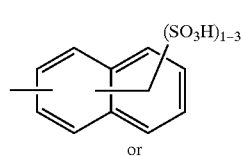
(3)

or

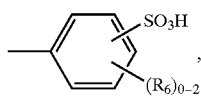
(4)

wherein
$(R_6)_{0-2}$ is 0 to 2 identical or different substituents selected from the group consisting of halogen, $C_2$–$C_4$alkanoylamino, $C_1$–$C_4$alkyl and $C_1$–$C_4$alkoxy,
$X_1$ and $X_2$ are halogen, and
$Y_1$ and $Y_2$ are each independently of the other a fibre-reactive radical of formula (5a), (5b), (5c) or (5d)

—SO$_2$—Z  (5a),

—CONH—(CH$_2$)$_m$—SO$_2$—Z  (5b),

—NH—CO—CH(Hal)—CH$_2$Hal  (5c) or

—NH—CO—C(Hal)=CH$_2$  (5d), wherein
m is the number 2, 3 or 4,
Hal is halogen, and
Z is vinyl or a radical —CH$_2$—CH$_2$—U, and U is a group which may be split off with alkali.

2. A dye mixture according to claim 1, wherein $R_1$, $R_2$, $R_4$ and $R_5$ are each independently of one another hydrogen or $C_1$–$C_4$-alkyl.

3. A dye mixture according to claim 1, wherein D defined as a radical of formula (3) is a radical of formula (3a)

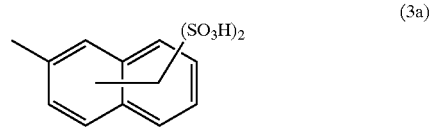
(3a)

and, defined as a radical of formula (4), is a radical of formula (4a)

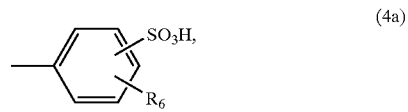
(4a)

wherein
$R_6$ is hydrogen, $C_1$–$C_4$-alkyl or $C_1$–$C_4$-alkoxy.

4. A dye mixture according to claim 1, wherein $X_1$ and $X_2$ are each independently of the other fluoro or chloro.

5. A dye mixture according to claim 1, wherein U is —Cl, —Br, —F, —OSO$_3$H, —SSO$_3$H, —OCO—CH$_3$, —OPO$_3$H$_2$, —OCO—C$_6$H$_5$, —OSO$_2$—C$_1$–C$_4$alkyl or —OSO$_2$—N(C$_1$–C$_4$alkyl)$_2$.

6. A dye mixture according to claim 5, wherein U is —Cl or —OSO$_3$H.

7. A dye mixture according to claim 1, wherein the radicals of formulae —A$_1$—Y$_1$ and A$_2$—Y$_2$ are each independently of the other a radical of formula (6a), (6b) or (6c)

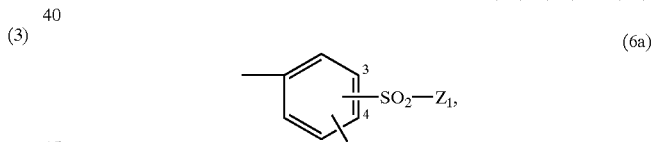
(6a)

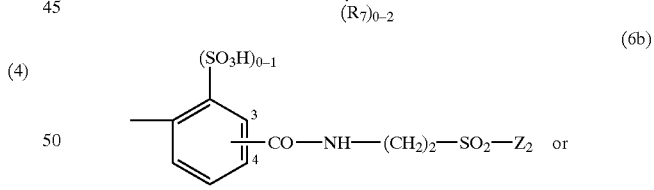
(6b)

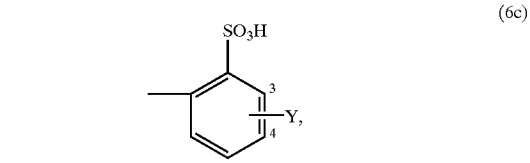
(6c)

wherein
$(R_7)_{0-2}$ is 0 to 2 identical or different substituents selected from the group consisting of sulfo, methyl and methoxy,
Y is α,β-dibromopropionylamino or α-bromoacryloylamino, and
$Z_1$ and $Z_2$ are each independently of the other vinyl, β-chloroethyl or β-sulfatoethyl.

8. A dye mixture according to claim 7, wherein the radicals of formulae —$A_1$—$Y_1$ and $A_2$—$Y_2$ are each independently of the other a radical of formula (6a) or (6b).

9. A dye mixture according to claim 1, which comprises at least one dye of formula (1a)

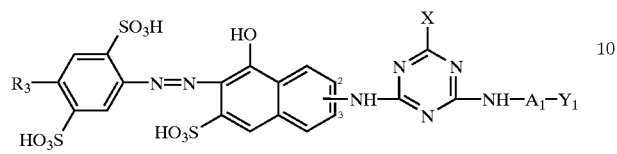
(1a)

together with at least one dye of formula (2a)

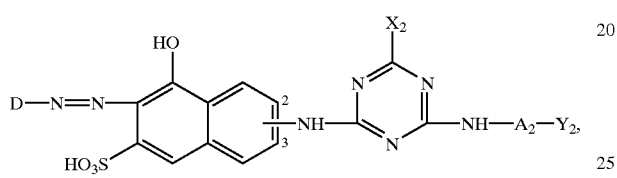
(2a)

wherein
$R_3$ is hydrogen, $C_1$–$C_4$alkyl or $C_1$–$C_4$alkoxy,
D is a radical of formula (3a) or (4a)

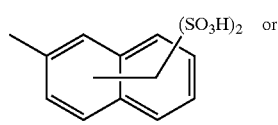
(3a)

(4a)

wherein
$R_6$ is hydrogen, $C_1$–$C_4$alkyl or $C_1$–$C_4$alkoxy,
$X_1$ and $X_2$ are each independently of the other fluoro or chloro, and —$A_1$—$Y_1$ and $A_2$—$Y_2$ are each independently of the other a radical of formula (6a) or (6b)

(6a)

(6b)

wherein
$(R_7)_{0-2}$ is 0 to 2 identical or different substituents selected from the group consisting of sulfo, methyl or methoxy, and
$Z_1$ and $Z_2$ are each independently of the other vinyl, β-chloroethyl or β-sulfatoethyl.

10. A dye mixture according to claim 9, which comprises at least one dye of formula (1b)

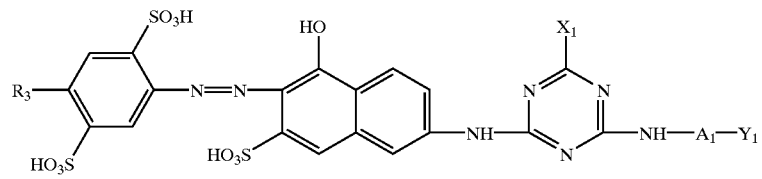
(1b)

together with at least one dye of formula (2b)

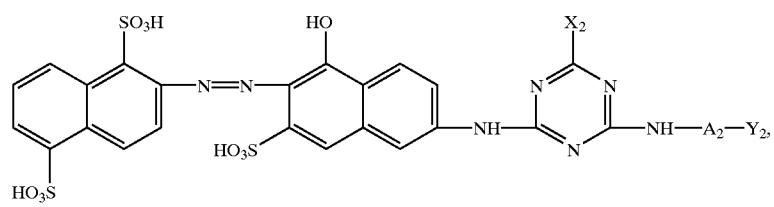
(2b)

wherein
$R_3$ is hydrogen or methyl, and
$X_1$ and $X_2$ and —$A_1$—$Y_1$ and $A_2$—$Y_2$ each have the meanings defined in claim 9.

11. A dye mixture according to claim 9, which comprises at least one dye of formula (1c)

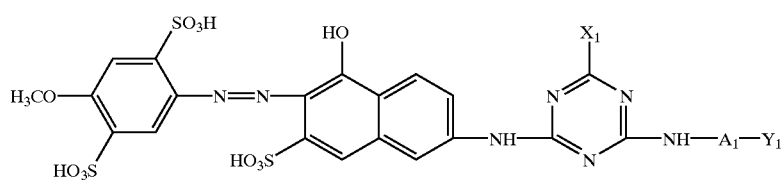

(1c)

together with at least one dye of formula (2c)

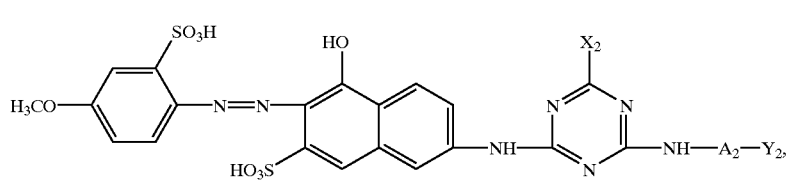

(2c)

wherein

X$_1$ and X$_2$ and —A$_1$—Y$_1$ and A$_2$—Y$_2$ each have the meanings defined in claim 9.

12. A process for the preparation of a dye mixture according to claim 1, which comprises reacting a compound of formula

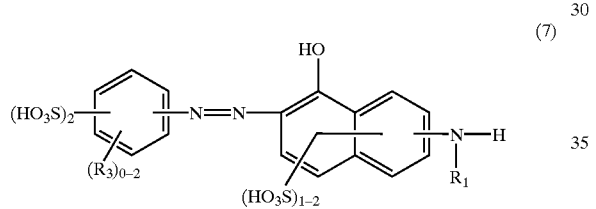

(7)

and a compound of formula

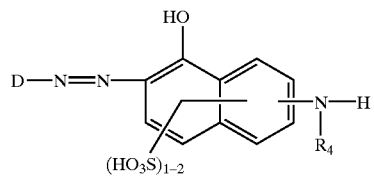

(8)

with cyanuric halide and an amine selected from the group consisting of formulae (9) and (10)

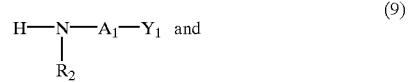

(9)

(10)

in any sequence,

R$_1$, R$_2$, R$_3$, R$_4$, R$_5$, A$_1$, A$_2$, D, Y$_1$ and Y$_2$ having the meanings defined in claim 1.

13. A method of dyeing or printing hydroxyl group-containing or nitrogen-containing fibre materials, which comprises contacting the materials with a tinctorially effective amount of a dye mixture according to claim 1.

14. A method according to claim 13, wherein the hydroxyl group-containing fibre materials are cellulosic fibre materials.

15. A method according to claim 14, wherein the cellulosic fibre materials are cotton-containing fibre materials.

* * * * *